US008247527B2

(12) United States Patent
Fader (10) Patent No.: US 8,247,527 B2
(45) Date of Patent: Aug. 21, 2012

(54) ENHANCED FINE AGGLOMERATE MIXTURE

(75) Inventor: John H. Fader, West Bloomfield, MI (US)

(73) Assignee: CBP Carbon Industries, Inc., New York, NY (US)

( * ) Notice: Subject to any disclaimer, the term of this patent is extended or adjusted under 35 U.S.C. 154(b) by 63 days.

(21) Appl. No.: 12/734,085

(22) PCT Filed: Oct. 9, 2008

(86) PCT No.: PCT/US2008/011616
§ 371 (c)(1),
(2), (4) Date: Apr. 9, 2010

(87) PCT Pub. No.: WO2009/048593
PCT Pub. Date: Apr. 16, 2009

(65) Prior Publication Data
US 2010/0210782 A1  Aug. 19, 2010

Related U.S. Application Data

(60) Provisional application No. 60/986,126, filed on Nov. 7, 2007, provisional application No. 60/998,197, filed on Oct. 9, 2007, provisional application No. 60/986,318, filed on Nov. 8, 2007, provisional application No. 60/986,369, filed on Nov. 8, 2007.

(51) Int. Cl.
*C08G 63/02* (2006.01)
*C08G 64/00* (2006.01)
(52) U.S. Cl. ............... 528/481; 264/4; 264/5; 264/6; 264/112; 264/118; 528/271; 528/272; 528/308; 528/310
(58) Field of Classification Search .......... 264/4, 5, 264/6, 112, 118; 528/271, 272, 308, 310
See application file for complete search history.

(56) References Cited

U.S. PATENT DOCUMENTS

| 2,958,472 | A | 11/1960 | Erickson et al. |
|---|---|---|---|
| 3,769,257 | A | 10/1973 | Gridley et al. |
| 4,221,608 | A | 9/1980 | Beckman |
| 5,389,691 | A | 2/1995 | Cha et al. |
| 2002/0189494 | A1 | 12/2002 | Jones, IV et al. |
| 2005/0023124 | A1 | 2/2005 | Karpetsky et al. |
| 2005/0222317 | A1 | 10/2005 | Yatsuyanagi et al. |
| 2008/0317794 | A1* | 12/2008 | Gellermann et al. ......... 424/401 |

FOREIGN PATENT DOCUMENTS

| DE | 25 10 297 | 9/1976 |
|---|---|---|
| EP | 0 211 117 A2 | 2/1987 |
| EP | 0 698 642 A1 | 2/1996 |
| EP | 1 548 509 | 6/2005 |
| GB | 659683 | 10/1951 |
| JP | 01 317555 A | 12/1989 |
| WO | WO 87/03220 | 6/1987 |
| WO | WO 00/14162 | 3/2000 |
| WO | WO 03/018855 A2 | 3/2003 |

OTHER PUBLICATIONS

Heinisch, K.; "Kautschuk-Lexikon, 2. Auflage"; 1977; pp. 432-437; Genter Verlag; Stuttgart; XP002512108.
"Rubber, Natural and Synthetic-General Test Methods; Carbon Black"; 1991 Annual Book of ASTM Standards, section 9; p. 317; Jan. 1, 1991; vol. 09.01; Philadelphia, Pennsylvania, USA.
Park, T. & Lovell, C.; "Using Pyrolized Carbon Black (PCB) from Waste Tires in Asphalt Pavement" Part 1, Limestone Aggregate from Civil Engineering Joint Transportation Research Program; Feb. 20, 1996; pp. 1-355; Purdue e-Pubs; http://docs.lib.purdue.edu/jtrp/222; West Lafayette, Indiana, USA.
Zeng, Y. & Lovell, C.; "Using Pyrolized Carbon Black (PCB) from Waste Tires in Asphalt Pavement" Part 2, Asphalt Binder from Civil Engineering Joint Transportation Research Program; Feb. 20, 1996; pp. 1-155; Purdue e-Pubs; http://docs.lib.purdue.edu/jtrp/223; West Lafayette, Indiana, USA.
Rostler, F.S., White, R.M. & Dannenberg, E.M.; "Carbon Black as a Reinforcing Agent for Asphalt"; Proceedings of the Association of Asphalt Paving Technologies (AAPT); 1977; pp. 376-401; vol. 46; XP009114874.
Park, T., Coree, B.J. & Lovell, C.W.; "Evaluation of Pyrolized Carbon Black from Scrap Tires as Additive in Hot Mix Asphalt"; Transportation Research Record; Jan. 1, 1996; pp. 43-55; Transportation Research Board, Washington; ISSN: 0361-1981.

* cited by examiner

*Primary Examiner* — Terressa Boykin
(74) *Attorney, Agent, or Firm* — Warn Partners, P.C.

(57) ABSTRACT

A fine agglomerates mixture formed from pyrolysis of recyclable polymeric material such as scrap tires, polymeric automotive components, used rubber materials, and plastic containers. The mixture contains a carbon content ranged between about 80% to about 95% by weight of the fine agglomerates mixture. The fine agglomerates mixture has agglomerate particles averaging less than or equal to 35 nm. The fine agglomerates mixture also has a nitrogen surface area greater than or equal to 73 $m^2/g$ and includes an inorganic functional filler in a range between about 5% to about 20% weight of the fine agglomerates mixture.

16 Claims, 10 Drawing Sheets

ENHANCED FINE AGGLOMERATE MIXTURE

CROSS-REFERENCE TO RELATED APPLICATIONS

This application is a National Stage of International Application No. PCT/US2008/011616, filed Oct. 9, 2008. This application claims the benefit of the following applications:
U.S. Provisional Application No. 60/986,126, filed Nov. 7, 2007.
U.S. Provisional Application No. 60/998,197 filed Oct. 9, 2007.
U.S. Provisional Application No. 60/986,318 filed Nov. 8, 2007.
U.S. Provisional Application No. 60/986,369 filed Nov. 8, 2007.
The disclosures of the above applications are incorporated herein by reference.

FIELD OF THE INVENTION

The present invention relates to a fine agglomerates mixture having desirable chemical and physical properties.

BACKGROUND OF THE INVENTION

In the rubber industry, rubber products such as vehicle tires and seals are made typically by compounding a mixture of fillers, such as carbon black or silica in rubber, which is then vulcanized. For vehicle tires, additional structural properties are introduced by embedding cords and by using different types of rubber in the tread, side-wall, and interior lining.

The manufacturer of rubber materials, such as a tire manufacturer, typically receives a raw material from different sources. Rubber is received in bales or possibly as a crumb or a powder. In making the rubber, filler materials such as carbon black are used.

The carbon black that is most desirable for use as a filler in rubber compounds such as tires, in its original state is called fluffy carbon black. Then it is pelletized or mixed in a slurry. Fluffy carbon black is carbon black agglomerates that consist of fine particles or agglomerates that are measured in nanometers (nm) and have a very low bulk density. There are several processes for making carbon black, including an oil furnace process. The oil furnace process essentially pyrolyses the oil to produce pure carbon particles often referred to as virgin carbon black. More recently there has been greater interest in producing and or reclaiming carbon blacks, including fluffy carbon black, from used rubber products such as scrap tires. Such processes essentially allow for the carbon black fillers to be extracted or recovered from the used rubber products and recycled back into new rubber products as filler materials.

There have been many attempts to recycle tires and other rubber products to reclaim usable hydrocarbons through the use of a process called pyrolysis. Through pyrolysis, tires and other oil based compounds are processed to produce fuel and other hydrocarbon compounds. One particular byproduct resulting from the pyrolysis process is a carbonaceous ash or char material which is leftover after the process is complete. Attempts have been made to use this char as a low grade carbon black for use as a type of filler. However, this has been met with several disadvantages, most significantly the disadvantage of the impurities in the char resulting from the random distribution of particle size of the char as well as unwanted impurities such as ash. Additionally the surface chemistry of the particles has an effect on the ability of the carbon black material to be used as a filler material and some of the past attempts have yielded black carbon agglomerate particles having unfavorable surface chemistry. Thus there exists a need to provide reclaimed carbonaceous mixtures that are suitable for use as a high grade filler material comparable to virgin carbon black material.

SUMMARY OF THE INVENTION

The present invention is directed to a fine agglomerates mixture formed from pyrolysis of recyclable polymeric material such as scrap tires, polymeric automotive components, used rubber materials, and plastic containers. The mixture contains has a carbon content ranged between about 80% to about 95% by weight of the fine agglomerates mixture. The fine agglomerates mixture has agglomerate particles averaging less than or equal to 35 nm. The fine agglomerates mixture also has a nitrogen surface area greater than or equal to 73 $m^2/g$ and includes an inorganic functional filler in a range between about 5% to about 20% weight of the fine agglomerates mixture.

The description of the invention is merely exemplary in nature and, thus, variations that do not depart from the gist of the invention are intended to be within the scope of the invention. Such variations are not to be regarded as a departure from the spirit and scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
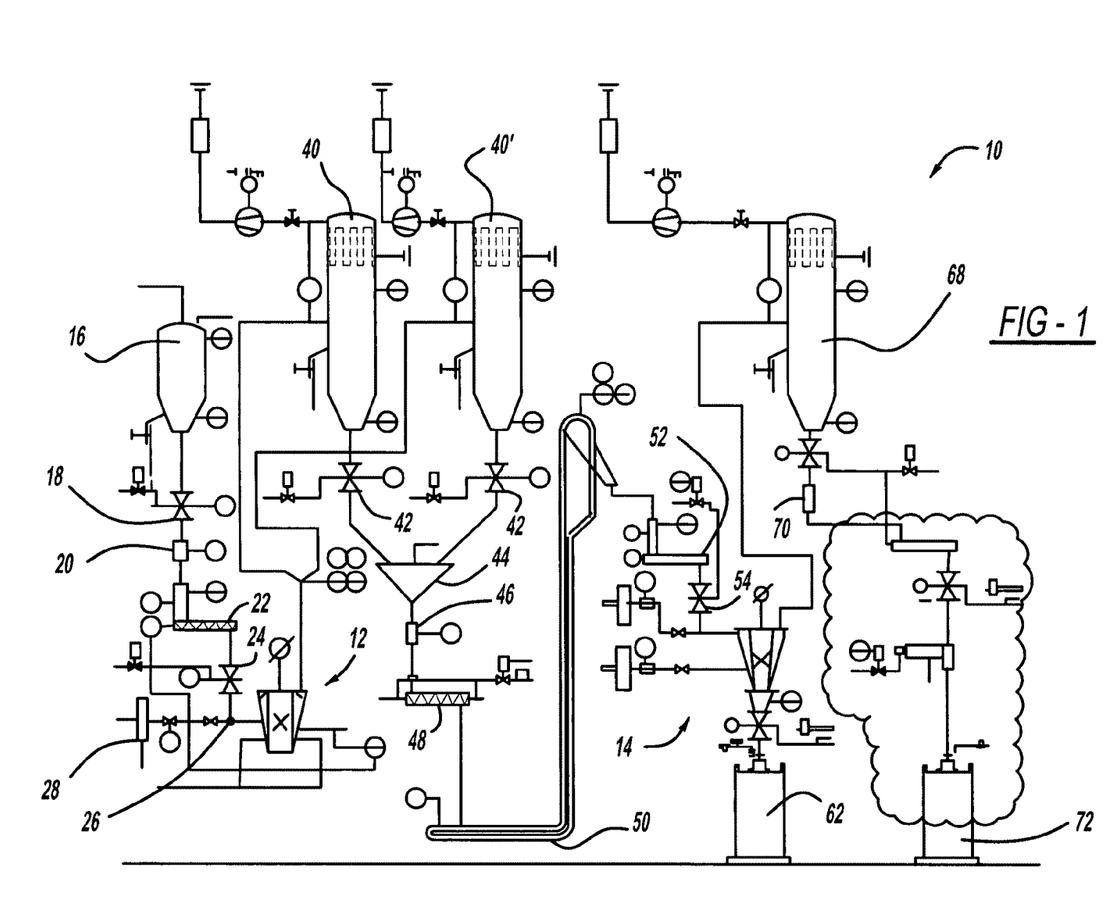
FIG. 1 is a prior art schematic view of a classification and identification apparatus.

The present invention is directed to the formation of a fine agglomerates mixture that is suitable for use as a filler material in an elastomer compound. The fine agglomerates mixture is prepared from pyrolyzed polymeric materials that have been treated using an identification and separation arrangement 10 in accordance with one aspect of the present invention. FIG. 1 depicts a schematic view of the identification and separation arrangement 10 in accordance with the present invention. Referring now to all of the figures and FIG. 1 in particular, the arrangement 10 includes a pulverizer mill 12 and a classifier 14. A hopper 16 serves as a source for the reclaimed carbonaceous materials to the arrangement 10. The hopper 16 is used to collect reclaimed carbonaceous materials prepared from the pyrolysis of recycled polymeric materials, such as but not limited to scrap tires, polymeric automotive components, used rubber materials, and plastic containers or the like. The reclaimed carbonaceous materials consist of large agglomerates, and small agglomerates of carbon black and other materials. While a collection hopper 16 is used to hold the reclaimed carbonaceous materials it is possible for the reclaimed carbonaceous materials to be fed directly into the arrangement 10 from a pyrolysis reactor (not shown) without first being collected in the hopper 16.

A valve 18 controls the flow of reclaimed carbonaceous materials from the hopper 16 to a magnet separator 20. The reclaimed carbonaceous materials sometimes have metal particles that were present in the recycled polymeric material prior to pyrolysis. These metal particles can harm the pulverizer mill 12 and the magnet separator 20 removes these unwanted metal particles. The use of the magnet separator 20 is not required and a greater or lesser number of magnet separators can be used.

After passing through the magnet separator 20 the reclaimed carbonaceous material is presented to a screw 22 that rotates and controls the flow of the material to the pulverizer mill 12. A valve 24 is used to turn on and off the flow of reclaimed carbonaceous material to a mixing node 26. At the mixing node 26 the reclaimed carbonaceous material is mixed with dry, filtered high pressure air generated from an air source 28. Together the mixture of dry pressurized air and reclaimed carbonaceous material are a feed that is introduced through a feed inlet 30 (see FIG. 2) of the pulverizer mill 12.

Figure 2:
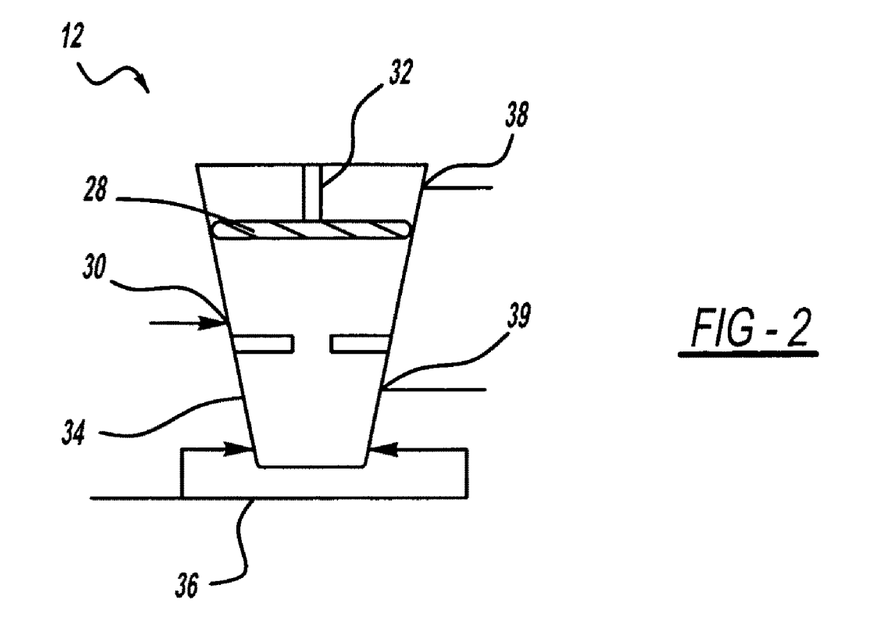
FIG. 2 is a plan schematic view of the pulverizer mill and the flow of carbon black through it in accordance with the present invention.

FIG. 2. depicts a schematic diagram of the pulverizer mill 12 which has a vortex column 28 where pressurized feed is introduced through the feed inlet 30 and swirls around the vortex column 28 causing the small agglomerates present in the feed to move to the top of the vortex column 28 while the larger agglomerates fall downward. While a single feed inlet 30 is described it is possible to have a greater number of feed inlets to adjust or enhance the swirling in the vortex column 28. A classifying disk 32 is present in the vortex column 28 and contributes to the swirling of the feed and prevents large agglomerates from moving past the classifying disk 22. The classifying disk 32 swirls the agglomerates and air in the vortex column 28 and uses specific gravity to separate the heavy dense agglomerates and particles from the lighter less dense agglomerates and particles. Thus the heavy dense agglomerates settle to the bottom of the vortex column 28, while the less dense agglomerates move to the top of the vortex column 28.

As the larger agglomerates move to the bottom of the vortex, they enter a fractionation chamber 34 of the pulverizer mill 12. At least two opposing air inlets 36 are present in the fractionation chamber 34 for blowing the large agglomerate particles at opposite sides of the chamber toward each other. While two opposing air inlets 36 are discussed it is possible to have a greater or lesser number of opposing air inlets 36. The large agglomerate particles are accelerated toward each other, collide and are fractionated into smaller agglomerates. The smaller agglomerates are reintroduced into the vortex column 28 where they go past the classification disk 32 if their density is low enough, and then travel out of a small agglomerates port 38. The larger agglomerates that do not get fractionated exit a chamber outlet 38 and are collected. Optionally the large agglomerates that leave via the chamber outlet 38 can be reintroduced to the reclaimed carbonaceous material at the valve 24.

The small agglomerates that pass through the small agglomerates port 38 flow on to one of two filter hoppers 40, 40'. The filter hoppers contain a polymer surface area filter that collects the small agglomerates which have tendency to become airborne after leaving the vortex column 28. The present invention describes using two filter hoppers for collecting the small agglomerates, however, it is within the scope of this invention for a greater or lesser number of filter hoppers to be used depending upon the rate of production from the pulverizer mill 12. Valves 42, 42' control the flow of small agglomerates from the filter hoppers 40, 40' onto a small agglomerate supply hopper 44 that is used to supply small agglomerates to the classifier 14. While FIG. 1 depicts multiple valves 42, 42' associated the filter hoppers 40, 40' it is possible to have a greater or lesser number of valves. After leaving the small agglomerate supply hopper 44 the small agglomerates are optionally passed through a second magnet filter 46 to further remove any metallic impurities present. A feed screw 48 receives the small agglomerates and controls the flow of small agglomerates supplied to a conveyor 50 that moves the small agglomerates to another feed screw 52 and valve 54 that control the flow of the small agglomerates to the classifier 14. It is with the scope of this invention to have the feed screw 48 flow directly to the classifier 14, however, it is preferable to use multiple feed screws and the conveyor because of the physical size of the components in the identification and separation arrangement 10 requires moving the small agglomerates a distance between components.

Figure 3:
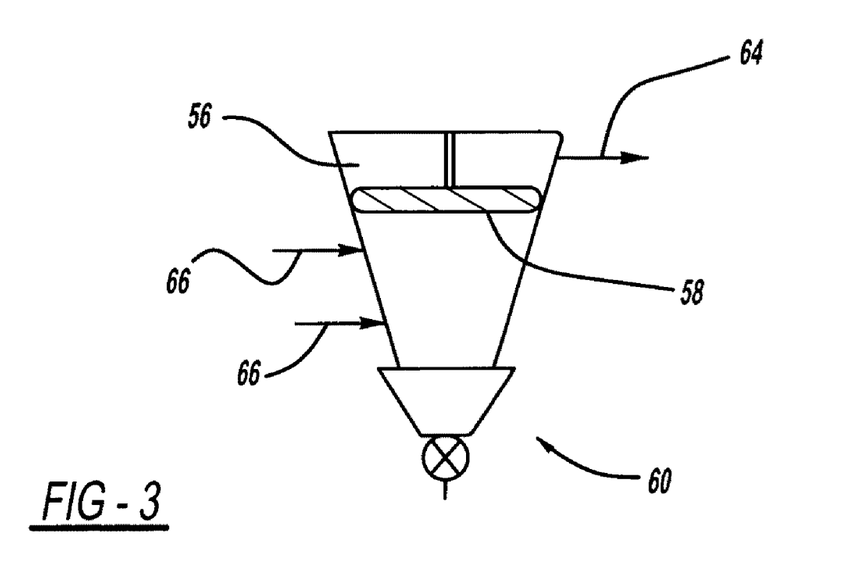
FIG. 3 is a plan schematic view of the classifier in accordance with the present invention.

Referring now to FIGS. 1 and 3 the small agglomerates enter the classifier 14 through the one of two high pressure inlets 66. The small agglomerates are mixed with dry pressurized air, fed through one of the two inlets 66 and are swirled in a vortex column 56 of the classifier 14 where the small agglomerates are separated into a coarse agglomerates mixture and a fine agglomerates mixture. Some of the small agglomerates are made of coarse agglomerates with fine agglomerates stuck to the coarse agglomerates. The swirling of the small agglomerates causes the fine agglomerates which have a low density and are sized in the nanometer range to separate from the coarse agglomerate particles which are much more dense and are measured in microns. The swirling action in the vortex column 56 is caused by the air pressure flowing through the high pressure inlets 66 and a rotary classification wheel 58 which causes the fine agglomerates which are less dense and have a smaller particle size to move to the top of the vortex column 56. The coarse agglomerates which are more dense and generally larger in size than the small agglomerates move to the bottom of the vortex column. It is within the scope of this invention to have a greater or lesser number of air inlets 66 as well as having the small agglomerates enter the vortex column 56 through more than one of the high pressure inlets 66.

The rotary classification wheel 58 functions in the same way as the classification disk 32 of the pulverizer mill 12 by only allowing agglomerates of a certain size and density to pass out of the vortex column 58 through a fine agglomerates outlet 64. The coarse agglomerates settle to the bottom of the vortex column 56 and are collected in a container 62 for use as a filler in processes where coarse agglomerates are acceptable. The fine agglomerates that pass through the fine agglomerates outlet 64 flow to a filter hopper 68 containing a polymeric surface area filter that collects the fine agglomerates. This step is necessary because the fine agglomerates are so small in size that they become easily airborne. After passing through the filter hopper 68 the fine agglomerates are then optionally passed through a magnet separator 70 to remove any metallic impurities that might be present and then the fine agglomerates are moved to a holding area 72 where they form a fine agglomerates mixture that is stored in a container, pelletizer, bag or blended with an elastomer to prevent the fine agglomerates from becoming airborne. The fine agglomerates mixture and coarse agglomerates mixture contain high amounts of carbon black and are useful filler materials that are comparable to virgin carbon blacks.

The fine agglomerates mixture in the holding area 72 are clusters of particles that include carbon black particles in accordance with the present invention. The fine agglomerates mixture is formed from the pyrolysis of polymeric materials such as tires, polymeric automotive components, recyclable polymeric components such as milk cartons and other containers, asphalt or any other suitable source of polymeric material that will yield fine agglomerates suitable for use as fillers in rubber compounding processes. The fine agglomerates mixture includes a carbon content of generally about 80% to about 95%; typically about 85% to about 90%, preferably about 89% to about 91%, and about 90% by weight of the fine agglomerates mixture in a preferred embodiment of the invention.

The average agglomerate size of the fine agglomerates mixture is less than or equal to 4 microns and are formed from clusters of fine agglomerate particles averaging less than or equal to 35 nm when dispersed in an aqueous solution and measured using electron microscopy. The size of the fine agglomerate particles is important from the standpoint that the smaller the agglomerate size the better they are for use as a high grade filler comparable to a N500 to N600 grade virgin carbon blacks.

The nitrogen surface area of the fine agglomerates mixture is another important factor in determining whether a filler material will be suitable as a high grade filler material. The nitrogen surface area is indicative of the binding affinity the filler material has when used in rubber compounding. The fine agglomerates mixture of the present invention generally has nitrogen surface areas that area measured using two different techniques, the BET technique and the Iodine absorption technique. The fine agglomerates mixture has a nitrogen surface area determined using the BET technique of generally about 46 $m^2/g$ to about 72 $m^2/g$ and preferably about 58 $m^2/g$. The fine agglomerates mixture has a nitrogen surface area determined using the iodine absorption technique of about 53 $mgl_2/g$ to about 254 $mgl_2/g$ and preferably about 176 $mgl_2/g$.

The fine agglomerates mixture also has pyrolyzed carbon black particles and inorganic functional filler material which after treatment by the separation and identification apparatus allows for the fine agglomerates mixture to function like a commercial carbon black having an N500 to N600 rating. The inorganic functional filler can be one selected from the following group; silica, alumina, titania, iron oxide, calcium oxide, magnesium or combinations thereof. It is also possible for other inorganic filler materials to be used provided that they allow for the fine agglomerates mixture to function like a desired grade of virgin carbon black. The present invention has functional inorganic fillers that are generally about 5% to about 20%; and typically about 8% to about 15%, preferably about 9% to about 11%, and in a preferred embodiment about 10% by weight of the fine agglomerates mixture.

EXAMPLE 1

The fine agglomerates mixture obtained from the identification and separation apparatus 10 are hereafter referred to as reclaimed carbonaceous mixture. The fine agglomerates mixture from the identification and separation apparatus 10 include a Carbon content of generally about 80% to about 95%; typically about 85% to about 91%, preferably about 89% to about 91%; and in a preferred embodiment about 90% by weight of the reclaimed carbonaceous mixture. The fine agglomerates mixture in accordance with the present invention have functional inorganic fillers that are generally about 5% to about 20%; and typically about 8% to about 15%, preferably about 9% to about 11%, and in a preferred embodiment about 10% by weight of the fine agglomerates mixture. The functional inorganic fillers are minerals that include but are not limited to Silica ($SiO_2$), Alumina ($Al_2O_3$), Titania ($TiO_2$), Iron Oxide ($Fe_2O_3$), Calcium Oxide (CaO), Magnesium Oxide (MgO). After these functional inorganic fillers are pyrolyzed and pass through the identification and separation arrangement 10 fine agglomerates mixture has mechanical and chemical properties equal to virgin carbon blacks that are N500 and N600 series carbon blacks.

Two of the more significant properties of the fine agglomerates mixture are the agglomerate size and nitrogen surface area of the agglomerates. It is desirable to have a small agglomerate size, high nitrogen surface area and a low relative agglomerate particle density. The fine agglomerates mixture when dispersed in a aqueous solution has a particle size range between about 10 nm to 35 nm; typically from about 15 nm to about 30 nm and preferably about 25 nm. The fine agglomerates mixture of the present invention generally have nitrogen surface areas that area measured using two different techniques, the BET technique and the Iodine absorption technique. The fine agglomerates mixture has a nitrogen surface area determined using the BET technique of generally about 46 $m^2/g$ to about 72 $m^2/g$ and preferably about 58 $m^2/g$. The fine agglomerates mixture has a nitrogen surface area determined using the iodine absorption technique of about 53 $mgl_2/g$ to about 254 $mgl_2/g$ and preferably about 176 $mgl_2/g$.

EXAMPLE 2

An analysis of the fine agglomerates mixture prepared using the above identification and classification apparatus 10 was performed and its properties were compared to other carbon black containing mixtures produced through the pyrolysis of materials. Table 1 outlined below shows an analysis of the carbon and ash content of each of the mixtures analyzed. The samples labeled 070614, 23615, 09620B, 09629M were obtained from CPH company and were produced using ambient pressure pyrolysis and then the material was treated by airwaves in the same conditions. The sample labeled CBp was a fine agglomerates mixture prepared in accordance with one embodiment of the present invention. The sample labeled CBP0 was a mixture of material coming from Pyrovac Company Canada, and was obtained by reduced pressure pyrolysis. The samples labeled KHC2 and KHKC1 were samples from the KHC Company (Taiwan) and were obtained by reduced pressure pyrolysis (KHC2) and also after a clarification from the mineral impurities by washing with acid solution (KHC1).

TABLE 1

CARBON AND ASH CONTENT OF THE CARBON PRODUCTS

| Carbon Product | % C | Ash % |
|---|---|---|
| 070614 | 80.41 | 19.5 |
| 023615 | 84.2 | 13 |
| 026202B | 78.52 | 17.5 |
| 026220M | 76.2 | 16 |
| CBp | 82 | 14.3 |
| CBp0 | 82.8 | 12.4 |
| KHC1 | 88.4 | 6.26 |
| KHC2 | 83.5 | 11.7 |

The CBp sample had a relatively high carbon content with a lower ash content when compared to several of the samples under study. The KHC1 sample had a lower ash content which was determined to be a result of a washing process that took place after pyrolysis. The washing process can remove some of the ash; however, it can have an undesirable affect on nitrogen surface area as discussed below.

For creating suitable fillers equivalent to virgin carbon blacks there are two characteristics, particle size and nitrogen surface area. Table 2 sets forth the nitrogen surface area data that was obtained from the samples analyzed. The nitrogen surface area was determined using two different techniques, the BET technique and the iodine absorption technique.

TABLE 2

| Carbon Product | $N_2$SA BET ($m^2$/g) | $n°I_2$ (mg$I_2$/g) |
|---|---|---|
| 070614 | 79 | 235 |
| 023615 | 81 | 247 |
| 026202B | 75 | 253 |
| 026220M | 42 | 226 |
| CBP0 | 73 | 255 |
| CBP | 58 | 176 |
| KHC1 | 45 | 52 |
| KHC2 | n.d. | 43 |

In particular it was found that the CBP material had good nitrogen surface area values when considering the average agglomerate particle size. The 070614, 023615, 026202B and 026220M and CBP0 samples all had higher nitrogen surface area values compared to the CBP sample, however, as we will see below these samples also had a much larger agglomerate size which is an undesirable characteristic.

With regard to particle size of the individual samples, Table 3 outlined below sets forth the average agglomerate particle size found for the samples under study. The particle size is referring to the size or average diameter of the particles forming the agglomerates when the agglomerates are dispersed in an aqueous solution.

TABLE 3

| Carbon Product | Particle Size (nm) |
|---|---|
| 070614 | 43 |
| 023615 | 36 |
| 026202B | 52 |
| 026220M | 59 |
| CBP0 | 40 |
| CBP | 27 |
| KHC1 | 47 |
| KHC2 | 48 |

The CBP sample, in accordance with this invention, had the smallest average particle size out of the samples tested.

Figure 4A:
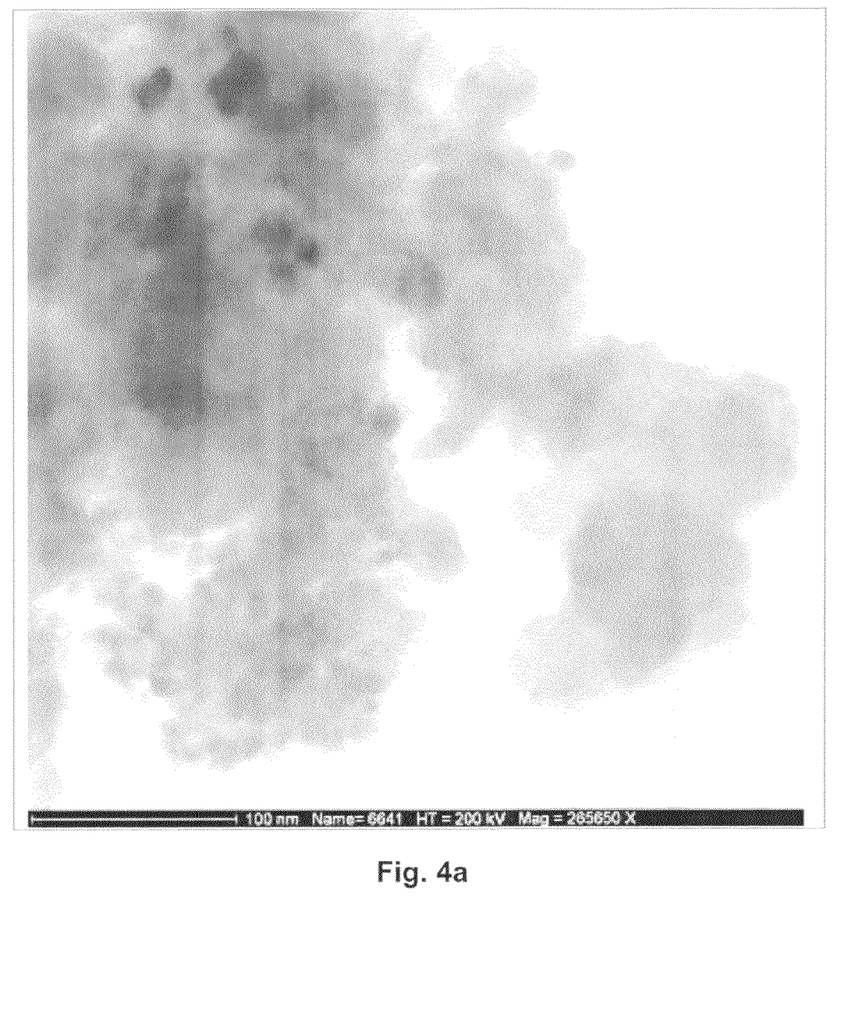
FIG. 4a is a microphotograph of the fine agglomerates mixture dispersed in an aqueous solution and magnified 265,650 times in accordance with the teachings of the present invention.
Figure 4B:
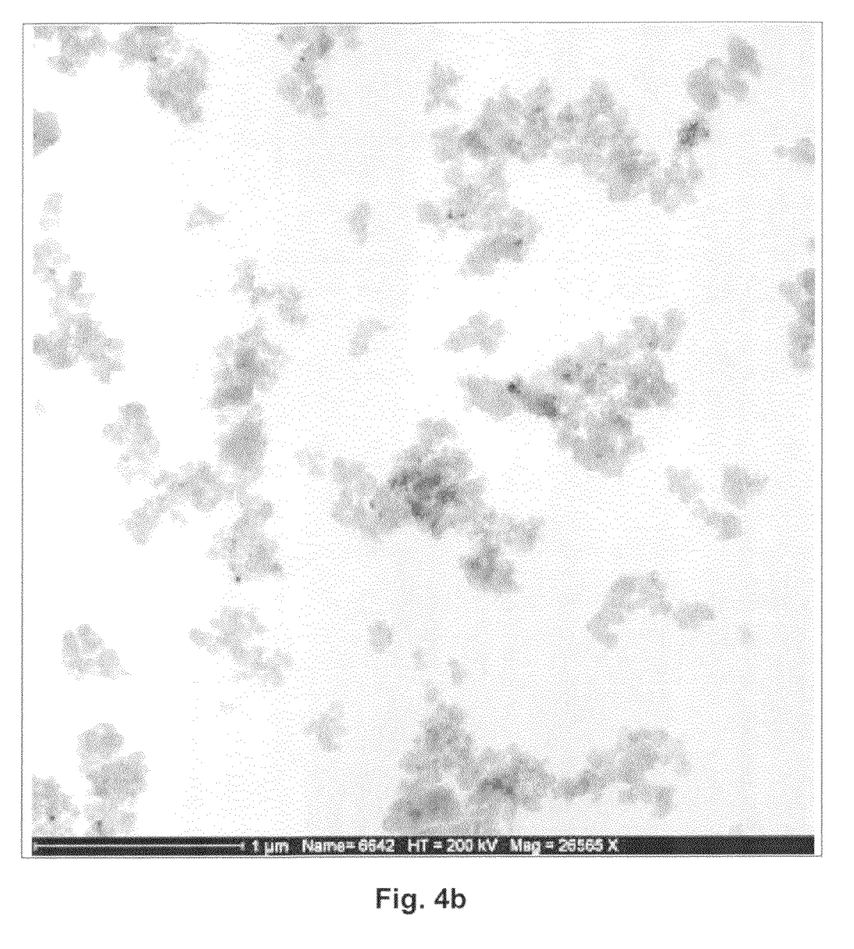
FIG. 4b is a microphotograph of the fine agglomerates mixture dispersed in an aqueous solution and magnified 26,565 times in accordance with the teachings of the present invention.
Figure 5A:
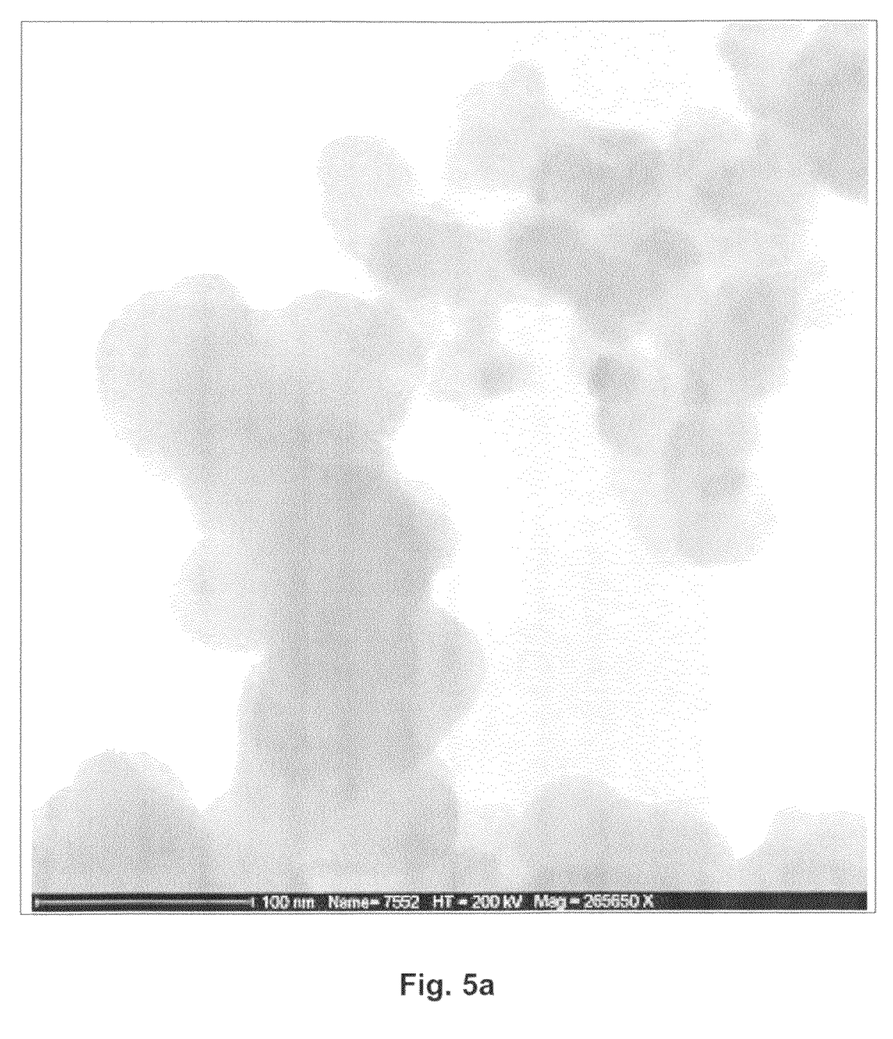
FIG. 5a is a microphotograph of the KHC1 aggregate dispersed in an aqueous solution and magnified 265,650 times.
Figure 5B:
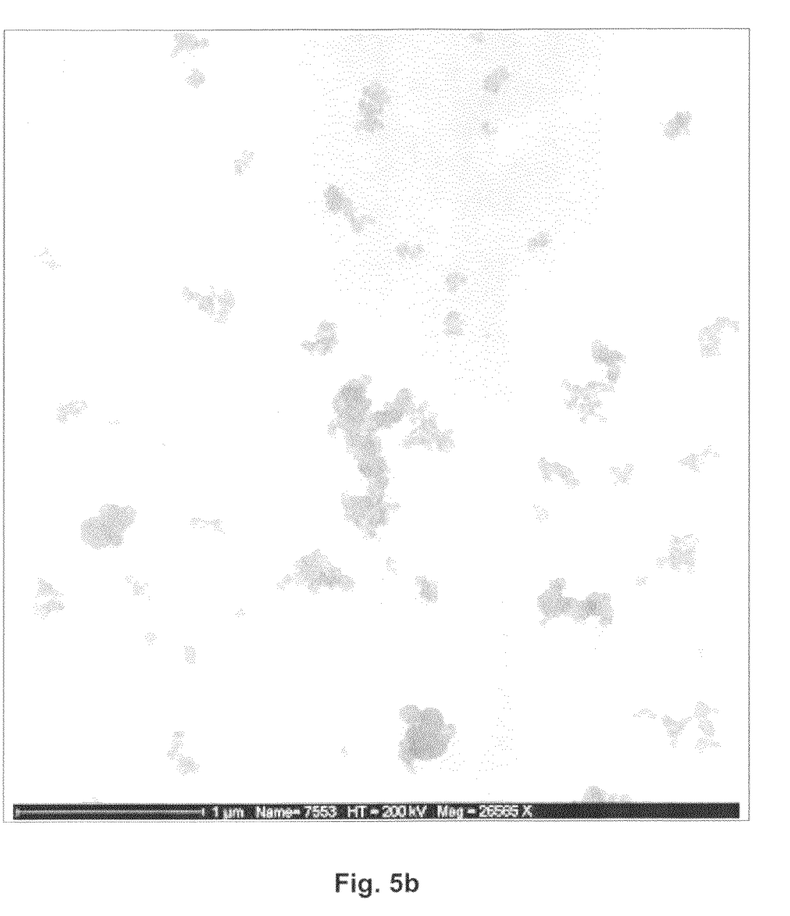
FIG. 5b is a microphotograph of the KHC1 aggregate dispersed in an aqueous solution and magnified 26,565 times.

FIG. 4a is a microphotograph of the CBP fine agglomerates mixture magnified 285,650 times, while FIG. 4b is the same aggregate magnified 28,650 times. FIG. 5a and FIG. 5b are microphotographs of the KHC1 aggregate magnified 285,650 times and 28,650 times respectively. An analysis of such microphotographs shows lighter, fuzzier agglomerates in the CBp sample. The KHC1 agglomerates show darker agglomerates with more solid shape which indicates that they are denser than the CBp agglomerates. This suggests that the bonding surface areas of these agglomerates are not as great. Microphotographs of the other samples could not be obtained.

Figure 6A:
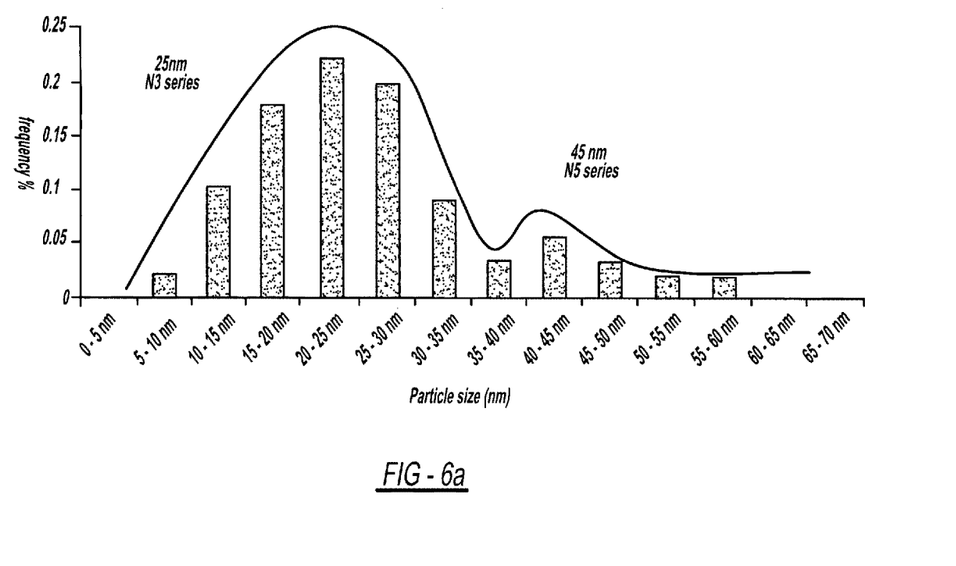
FIG. 6a is a graph illustrating the particle size distribution of the fine agglomerates mixture in accordance with the teachings of the present invention.
Figure 6B:
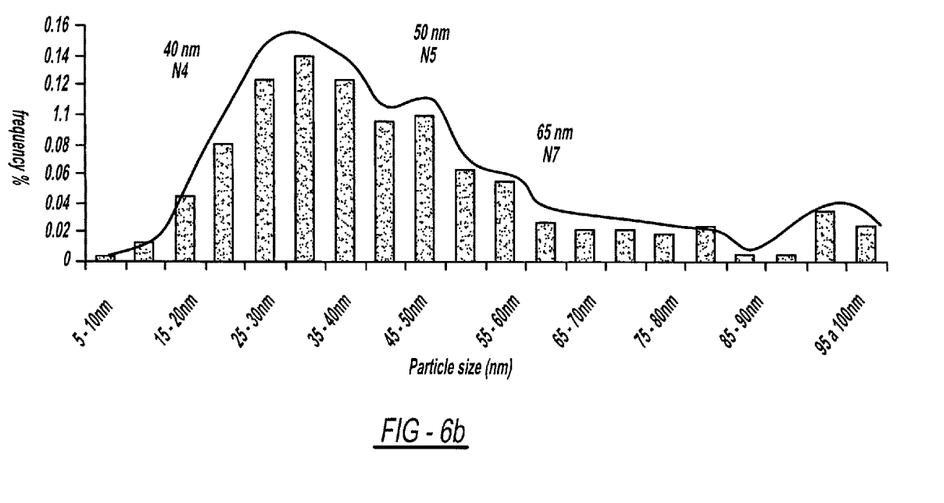
FIG. 6b is a graph illustrating the particle size distribution of the KHC1 sample.
Figure 6C:
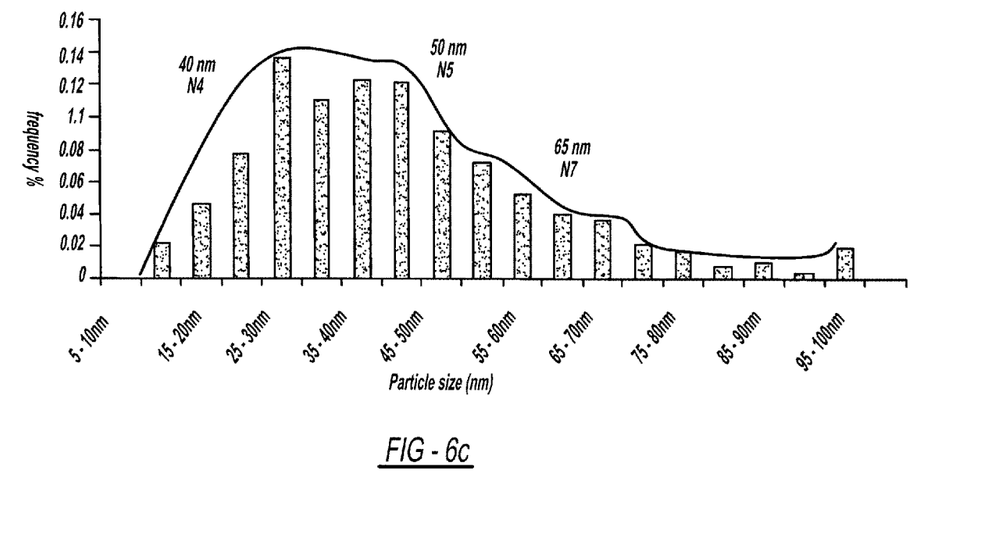
FIG. 6c is a graph illustrating the particle size distribution of the KHC2 sample.
Figure 6D:
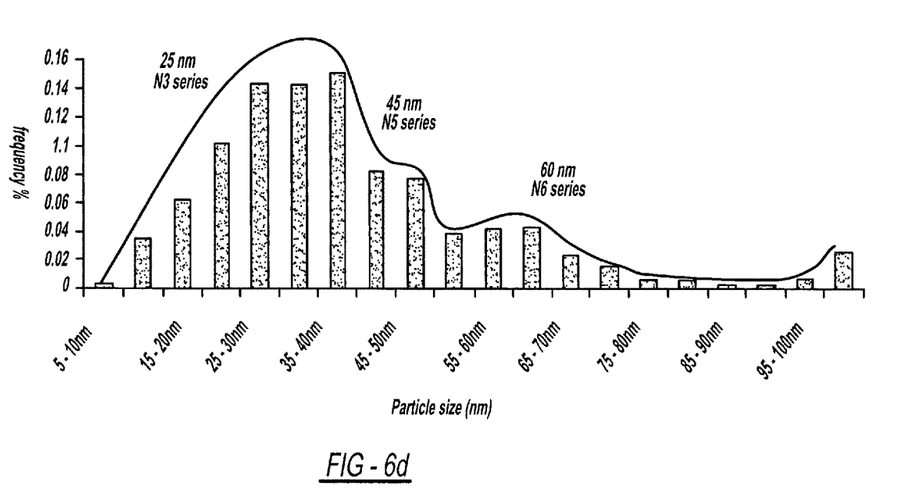
FIG. 6d is a graph illustrating the particle size distribution of the CBp0 sample.

FIGS. 6a-6d are graphs illustrating the particle size distribution of the CBP, KHC1, KHC2, and CBP0 samples that were tested. FIG. 6a shows that the CBP sample has a particle or agglomerate size distribution that centers between 22-25 nm with the distribution of particles varying from that point. FIG. 6b is a graph of the particle size distribution data for the KHC1 sample. This data shows a much wider particle size distribution that ranges from 25-30 nm to 40-50 nm. FIG. 6c is a graph of the particle size distribution for the KHC2 sample, which shows a much wider dispersion of particles with the highest frequencies between 40 nm all the way up to 65 nm. FIG. 6d is a graph showing the particle size distribution of the CBP0 sample which has a much lower frequency of particles between 25-45 nm range than compared to the CBP mixture prepared in accordance with the present invention. Also, the CBP0 sample has a higher frequency of particles in the 45-60 nm range. Overall the particle size dispersion shown in FIGS. 6a-6d illustrates that the CBP sample has a much higher frequency in consistency of particles when compared to the other samples tested.

Additional information and examples of the materials used in accordance with the present invention can be found in the following applications: U.S. patent application No. 60/998, 197 entitled "Elastomer Composition with Reclaimed Filler Material," Filed Oct. 9, 2007, application No. 60/986,318 entitled "Process For Classifying Particles In A Pyrolysed Char," filed Nov. 8, 2007, application No. 60/986,369 entitled "Asphalt Composition Using Pyrolysed Carbonaceous Materials," filed Nov. 8, 2007, and application No. 60/986,126 entitled "Enhanced Fine Agglomerate Mixture," filed Nov. 7, 2007, wherein the entirety of each application is hereby incorporated by reference.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fine agglomerates mixture formed from pyrolysis of polymeric materials comprising:
    fine agglomerates include carbon black particles with an average particle size less than or equal to 35 nm and an inorganic functional filler in a range between about 5% to about 20% weight of said fine agglomerates mixture and wherein said fine agglomerates mixture has a surface area value in a range between about 53 mg $I_2$/g to about 254 mg $I_2$/g measured by iodine absorption.

2. The fine agglomerates mixture of claim 1, wherein said polymeric materials consist essentially of scrap tires.

3. The fine agglomerates mixture of claim 1, wherein said polymeric materials consist essentially of used polymeric automotive components.

4. The fine agglomerates mixture of claim 1, wherein said polymeric materials consist essentially of recyclable polymeric materials.

5. The fine agglomerates mixture of claim 1 wherein said fine agglomerates mixture has a nitrogen surface area greater than or equal to 46 $m^2/g$.

6. The fine agglomerates mixture of claim 1 wherein said fine agglomerates mixture meets the requirements for use as a N600 or N500 grade virgin carbon black filler.

7. A fine agglomerates mixture comprising:
fine agglomerates formed from pyrolysis of polymeric materials said fine agglomerates mixture including carbon black particles having an average particle size of less than or equal to 35 nm and an inorganic functional filler, said fine agglomerates mixture has a carbon content in a range substantially between about 80% to about 95% by weight of said mixture and an inorganic functional filler in a range between about 5% to about 20% weight of said fine agglomerates mixture wherein said fine agglomerates have a surface area value in a range between about 53 mg $l_2$/g to about 254 mg $l_2$/g measured by iodine absorption.

8. The fine agglomerates mixture of claim 7, wherein said fine agglomerates have an average particle size of less than or equal to 35 nm.

9. The fine agglomerates mixture of claim 7, wherein said fine agglomerates have a nitrogen surface area greater than or equal to 73 $m^2/g$.

10. The fine agglomerates mixture of claim 7, wherein said polymeric materials consist essentially of scrap tires.

11. The fine agglomerates mixture of claim 7, wherein said polymeric materials consist essentially of used polymeric automotive components.

12. The fine agglomerates mixture of claim 7, wherein the polymeric materials consist essentially of recyclable polymeric materials.

13. The fine agglomerates mixture of claim 7, wherein said fine agglomerates mixture meets the requirements for use as a N600 or N500 grade virgin carbon black filler.

14. A fine agglomerates mixture comprising:
a fine agglomerates mixture from pyrolysis of scrap tires, said fine agglomerates mixture including carbon black particles having an average particle size of less than or equal to 35 nm, an inorganic functional filler in a range between about 5% to about 20% weight of said fine agglomerates mixture and said fine agglomerates mixture having a nitrogen surface area greater than or equal to 73 $m^2/g$ and have a surface area value in a range between about 53 mg $l_2$/g to about 254 mg $l_2$/g measured by iodine absorption.

15. The fine agglomerates mixture of claim 14, wherein said fine agglomerates mixture is between about 80% to about 95% carbon by weight.

16. The fine agglomerates mixture of claim 14 wherein said fine agglomerates meets the requirements for use as a N600 or N500 grade virgin carbon black filler.

* * * * *